(12) United States Patent
Huang

(10) Patent No.: US 8,594,647 B2
(45) Date of Patent: Nov. 26, 2013

(54) METHOD AND APPARATUS FOR SELF-ADAPTIVE ADJUSTMENT OF PILOT POWER OF FEMTO CELL

(75) Inventor: Zhiqiang Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,141

(22) PCT Filed: May 25, 2010

(86) PCT No.: PCT/CN2010/073184
§ 371 (c)(1),
(2), (4) Date: Apr. 12, 2012

(87) PCT Pub. No.: WO2010/145419
PCT Pub. Date: Dec. 23, 2010

(65) Prior Publication Data
US 2012/0190352 A1    Jul. 26, 2012

(30) Foreign Application Priority Data
Oct. 13, 2009   (CN) .......................... 2009 1 0180296

(51) Int. Cl.
*H04M 3/00*         (2006.01)
(52) U.S. Cl.
USPC ........................................................ 455/418
(58) Field of Classification Search
USPC ........... 455/522, 127.1, 525, 446, 509, 452.1,
455/423, 422.1; 370/329, 328, 252;
375/267, 227, 296, 285
See application file for complete search history.

(56) References Cited

U.S. PATENT DOCUMENTS

| | | | |
|---|---|---|---|
| 8,285,322 B2 * | 10/2012 | Chen et al. | 455/525 |
| 2004/0242257 A1 | 12/2004 | Valkealahti et al. | |
| 2009/0042596 A1 * | 2/2009 | Yavuz et al. | 455/522 |
| 2009/0082026 A1 * | 3/2009 | Yavuz et al. | 455/446 |
| 2009/0286496 A1 * | 11/2009 | Yavuz et al. | 455/127.1 |
| 2010/0022266 A1 | 1/2010 | Villier et al. | |

FOREIGN PATENT DOCUMENTS

| | | |
|---|---|---|
| CN | 1559112 A | 12/2004 |
| CN | 101188445 A | 5/2008 |
| CN | 101674600 A | 3/2010 |
| WO | 2008091412 A1 | 7/2008 |

OTHER PUBLICATIONS

International Search Report in international application No. PCT/CN2010/073184, mailed on Sep. 2, 2010.
English Translation of the Written Opinion of the International Search Authority in international application No. PCT/CN2010/073184, mailed on Sep. 2, 2010.
Vehicular Technology Conference, Sep. 2009.

* cited by examiner

*Primary Examiner* — Kiet Doan
(74) *Attorney, Agent, or Firm* — Oppedahl Patent Law Firm LLC

(57) ABSTRACT

A method and apparatus for self-adaptive adjustment of pilot power of Femto Cell are provided in the present disclosure, which adopt a new power control mechanism. After the pilot power of a Femto Cell is initialized, the Femto Cell determines the adjustment value of the pilot power according to the signal-to-noise ratio reported by the HUE in real time, accordingly controls the pilot power of the Femto Cell accessed by each HUE, and enables the pilot power of the current Femto Cell to just satisfy the lowest transmission signal power required by the signal of the HUE in the coverage of the Femto Cell. The present disclosure can maximally reduce the interference from the pilot power of the Femto Cell in the macro cell users and the interference between the Femto Cells, while still guarantees the lowest transmission power needed by the HUE.

9 Claims, 3 Drawing Sheets

METHOD AND APPARATUS FOR SELF-ADAPTIVE ADJUSTMENT OF PILOT POWER OF FEMTO CELL

TECHNICAL FIELD

The present disclosure relates to the inter-cell interference suppression technique, in particular to a method and apparatus for self-adaptive adjustment of pilot power of Femto Cell (also known as Home node B or a Third Generation (3G) access point).

BACKGROUND

Global System for Mobile communications (GSM) has experienced three generations from the 1980s to the present, wherein a first generation is analog cellular system; a second generation is GSM and narrowband Code Division Multiple Access (CDMA) digital cellular system; and a third generation is wideband digital cellular system based on CDMA. Currently, the 3G Long Term Evolution (LTE) and the Fourth Generation (4G) mobile communication system both based on Orthogonal Frequency Division Multiplexing (OFDM) are being intensively studied.

However, as for the case that the work of the current 3G, the future LTE and 4G will is be operated in a frequency band higher than 2 GHz, the attenuation of radio signals in this frequency band is faster and the penetrability into buildings is worse, compared with radio signals in the traditional GSM900 frequency band. Furthermore, according to relevant statistics, 60% of the telephone traffic is generated indoors, thus, how to improve the indoor coverage of the 3G has always been a big problem for operators, and generally it is difficult for mobile terminal users to enjoy high-speed data services provided by the 3G indoors. In addition, due to the respiration effect of the 3G, the coverage of the macro node B will be reduced when traffic load of a macro cell is increased. The introduction of Femto Cell will largely share the telephone traffic of the macro cell, thus providing users in the macro cell with better voice quality. FIG. 1 shows a schematic diagram of the coverage of a macro node B and the coverage of a Femto Cell in a macro cell after the Femto Cell is introduced.

In recent years, Femto Cell is a new concept introduced by communication equipment manufacturers and communication operators according to the 3G and the evolution scheme thereof as well as the trend in mobile broadband. The concept of Femto Cell was put forward by the British company Ubiquisys among the first, and originated from insufficient coverage of the 3G in the initial stage and the challenge from the Wireless Fidelity (Wi-Fi) technique. Femto Cell provides a rapid and low-cost solution of 3G indoor coverage for households and medium or small enterprises, thus, Femto Cell is usually known as home node B with a signal coverage radius of 15-200 meters. Different from the concepts of Micro Cell and Pico Cell, only the air interface part of the Femto Cell meets the Third Generation Partnership Project (3GPP) standards or the Third Generation Partnership Project Two (3GPP2) standards; at the data backhaul side, a home fixed broadband access equipment, such as an Asymmetric Digital Subscriber Line (ADSL) modem, a cable modem etc., is applied, and the date is subsequently aggregated by a Femto Cell gateway equipment and accessed to a core network by a interface corresponding to the standard of the core network. The size of the Femto Cell is similar to an ADSL modem, which is featured with convenient is installation, automatic configuration, automatic network planning optimization, and plug-and-play. After the mobile terminal user acquires the Femto Cell from the operator, so long as the mobile terminal is powered on and is connected with a network, the Femto Cell can automatically complete Internet Protocol (IP) connection and IP distribution, and perform remote automatic software upgrading and automatic network planning, selection of the minimal interference frequency point, automatic distribution of scrambling codes, automatic establishment of a neighbor cell list and automatic regulation of transmission power.

Femto Cell is applicable to various standards, such as CDMA, GSM, Universal Mobile Telecommunications System (UMTS) etc., supports products of the Second Generation (2G), 2.5G and 3G, and has the same system and frequency band as other mobile base stations of operators, thus mobile terminals such as mobile phone can be used in the above-mentioned communication environment. Femto Cell has one carrier with the transmission power of 10-100 mW and coverage radius of 15-200 m. Femto Cell supports 4-6 active users and allows a maximal user motion speed of 10 km/h.

All the current third generation mobile communication standards are based on CDMA technology. One large advantage of the CDMA is the high spectrum reuse rate, which allows all macro node Bs to work under a unified carrier frequency, however, CDMA is also an interference-limited system; the capacity of the macro cell will be reduced when the co-channel interference of the macro cell is increased. The introduction of a great amount of unplanned Femto Cells will lead to great interference in the current macro cell. It is because that the over-high pilot power of Femto Cell will generate interference on the mobile user terminals in other macro cells, and especially for the macro cell mobile user terminals nearby the Femto Cell, the interference will become more serious. For example, a macro cell User Equipment (UE) is making a call will suffer relatively strong downlink interference when entering the coverage of the Femto Cell and it may cause dropped call when the situation becomes serious.

At present, a common solution is to configure a carrier which is different from that of the macro cell for the Femto Cell. However, when a great amount of Femto Cells are deployed, there will also be relatively strong interference between the Femto Cells; is particularly in relatively densely-populated residential areas the interference cannot be effectively solved even though a plurality of different carrier frequencies are used by the Femto Cells. Moreover, due to the lack of spectrum resources, operators can seldom have several 3G carrier frequencies; for example, the bandwidth of a single carrier frequency in the Wideband CDMA (WCDMA) standard is 5MHz and generally every operator is allocated with 2-3 frequency bands by the abroad issued WCDMA license at present, but this spectrum resources apparently cannot satisfy the need of large-scale deployment of Femto Cells.

The main function of a downlink pilot channel of the Femto Cell is to provide channel estimation and perform related demodulation for the mobile user terminal on the one hand, and provide measurement basis for the handover of the mobile user terminal between Femto Cells on the other hand. Another method to reduce interference from Femto Cells in macro cell users is to fix the value of downlink pilot power of the Femto Cell to be approximately 10% of the total transmission power of the node B.

Many researchers have learned in practice that, the setting of the fixed downlink pilot channel power is also inappropriate, because the fixed downlink pilot channel power will result in unnecessary waste during the no-load period. Thus, it remains a problem to be solved to maximally reduce the interference from the pilot power of Femto Cell in the macro cell user and the interference between the Femto Cells while still guarantees the lowest transmission power needed by the user.

SUMMARY

The technical problem to be solved by the present disclosure is to provide a method and apparatus for self-adaptive adjustment of pilot power of Femto Cell, to maximally reduce the interference from the pilot power of Femto Cell in macro cell users and the interference between the Femto Cells, while still guarantees the lowest transmission power needed by the home user equipment (HUE).

The present disclosure adopts the following technical solution: a method for self-adaptive adjustment of pilot power of Femto Cell, including:

pilot power of a Femto Cell initialized, and the Femto Cell determines an adjustment value of the pilot power according to a signal-to-noise ratio reported by a Home User Equipment (HUE) in real time.

Initializing the pilot power of the Femto Cell may include: obtaining a Received Signal Coding Power (RSCP) threshold of edge pilot power of the Femto Cell through link budget; setting a pilot power threshold of the Femto Cell based on a maximum downlink transmission power of the Femto Cell; and setting an initial value of the pilot power of the Femto Cell as a smaller one from the RSCP threshold of the edge pilot power of the Femto Cell or the pilot power threshold.

Obtaining the RSCP threshold of edge pilot power of the Femto Cell through link budget may include:

introducing a radius of the Femto Cell and a number of indoor walls into a link budget reference formula PL=37+20 log d+qW to calculate link loss, where PL is the link loss or path attenuation, and its unit is dB; d is the radius of Femto Cell, and its unit is meter; q is the number of indoor walls and varies depending on d;

adding an effective demodulation threshold of the HUE to the link loss to obtain the RSCP threshold of the pilot.

Setting the pilot power threshold of the Femto Cell based on the maximum downlink transmission power of the Femto Cell may include: setting 10% of the maximum downlink transmission power of the Femto Cell as the pilot power threshold of the Femto Cell.

Determining the adjustment value of the pilot power according to the signal-to-noise ratio reported by the HUE in real time may include:

the HUE obtains bandwidth reception power in a whole channel frequency band through a current received signal strength index; divides the bandwidth reception power in the whole channel frequency band by a background noise of the HUE to obtain the signal-to-noise ratio; and reports the signal-to-noise ratio to the Femto Cell;

the Femto Cell records a number of the signal-to-noise ratios reported by all HUEs covered by the Femto Cell as $N_{total}$, counts a number of the signal-to-noise ratios whose value are larger than the set threshold and recording the number as $N_{over}$;

calculates a target adjustment value of the pilot power according to a formula $$\Delta C_{coverage} = \frac{N_{over}}{N_{total} \times \text{Coverage\_Target}} - 1,$$

where Coverage_Target is a target coverage value of the Femto Cell, which is set as 99%≤Coverage_Target<100%;

calculates a pilot power $P_{new}$ needed by the Femto Cell to determine the adjustment value of the pilot power according to the calculated target adjustment value of the pilot power through following formulae:

$$\Delta \log P = -\alpha \Delta C_{coverage},$$

$P_{new} = e^{\Delta \log P} \times P_{old}$, where $\alpha$ is an indoor attenuation coefficient and its range is $0<\alpha<1$.

The present disclosure further provides an apparatus for self-adaptive adjustment of pilot power of Femto Cell, including: a pilot power initialization module, a signal-to-noise ratio detecting and reporting module and a pilot power adjustment value calculating module, wherein the pilot power initialization module is located in a Femto Cell and is configured to obtain a Received Signal Coding Power (RSCP) threshold of edge pilot power of the Femto Cell through link budget, set a pilot power threshold of the Femto Cell based on a maximum downlink transmission power of the Femto Cell, and set an initial value of the pilot power of the Femto Cell as a smaller one from the RSCP threshold of the edge pilot power of the Femto Cell OR the pilot power threshold;

the signal-to-noise ratio detecting and reporting module is located in a Home User Equipment (HUE) and is configured to detect a signal-to-noise ratio in real time and report the signal-to-noise ratio to the pilot power adjustment value calculating module;

the pilot power adjustment value calculating module is located in the Femto Cell and is configured to determine an adjustment value of the pilot power according to the signal-to-noise ratio reported by the signal-to-noise ratio detecting and reporting module in real time.

The pilot power initialization module may be further configured to:

introduce a radius of the Femto Cell and a number of indoor walls into a link budget reference formula PL=37+20 log d+qW to calculate link loss, where PL is the link loss or path attenuation, and its unit is dB; d is the radius of Femto Cell, and its unit is meter; q is the number of indoor walls and varies depending on d; and add an effective demodulation threshold of the HUE to the link loss to obtain the RSCP threshold of the pilot.

The pilot power initialization module may be further configured to set 10% of the maximum downlink transmission power of the Femto Cell as the pilot power threshold of the Femto Cell.

The signal-to-noise ratio detecting and reporting module may be further configured to: obtain bandwidth reception power in a whole channel frequency band through a current received signal strength index, divide the bandwidth reception power in the whole channel frequency band by a background noise of the HUE to obtain the signal-to-noise ratio and report the signal-to-noise ratio to the Femto Cell.

The pilot power adjustment value calculating module may be further configured to: record a number of the signal-to-noise ratios reported by all signal-to-noise ratio detecting and reporting modules covered by the Femto Cell as $N_{total}$, count a number of the signal-to-noise ratios whose value are larger than the set threshold and record the number as $N_{over}$;

calculate a target adjustment value of the pilot power according to a formula $$\Delta C_{coverage} = \frac{N_{over}}{N_{total} \times \text{Coverage\_Target}} - 1,$$

where Coverage_Target is a target coverage value of the Femto Cell, which is set as 99%≤Coverage_Target<100%; and calculate a pilot power $P_{new}$ needed by the Femto Cell to determine the adjustment value of the pilot power according to the calculated target adjustment value of the pilot power through following formulae:

$$\Delta \log P = -\alpha \Delta C_{coverage},$$

$P_{new} = e^{\Delta \log P} \times P_{old}$, where $\alpha$ is an indoor attenuation coefficient and its range is $0<\alpha<1$.

By adopting the aforementioned technical solutions, the present disclosure at least is has the following advantages:

the method and apparatus for self-adaptive adjustment of pilot power of Femto Cell described in the present disclosure adopt a new power control mechanism: after the pilot power of the Femto Cell is initialized, the Femto Cell determines the adjustment value of the pilot power according to the signal-to-noise ratio reported by the HUE in real time, accordingly controls the pilot power of the Femto Cell accessed by each HUE, and enables the pilot power of the current Femto Cell to just satisfy the lowest transmission signal power required by the signal target of the HUE in the coverage of the Femto Cell. The present disclosure can realize accurate power control, and reduce the interference level of the system to improve system capacity, the present disclosure can also allow the HUE to be more effectively accessed to the network. The present disclosure can maximally reduce the interference from the pilot power of the Femto Cell in the macro cell users and the interference between the Femto Cells while still guarantees the lowest transmission power needed by the HUE. In the self-adaptive control method of the present disclosure, the call blocking rate of the macro cell is obviously reduced when the load of the Femto Cell is low.

DETAILED DESCRIPTION

In order to further describe the technical means adopted by the present disclosure to achieve the expected goal, and the effect of the technical means, the method and apparatus for self-adaptive adjustment of pilot power of Femto Cell, which are put forward by the present disclosure, are described in details according to the drawings and is preferred embodiments hereinafter.

The description of the embodiments of the present disclosure is based on a WCDMA mobile communication system, wherein 50 home node Bs, i.e. 50 Femto Cells are covered by a macro cell. The macro cell adopts an omnidirectional antenna with the maximum downlink transmission power is 20 W; the power of the common control channel is 3 W; the antenna gain is 11 dBi and the radius of the cell is 1 km. In view of the influence on the city environment, the radius of the Femto Cell covered by the home node B is set as 15 m and the maximum downlink transmission power is set as 10 dbm.

Figure 1:
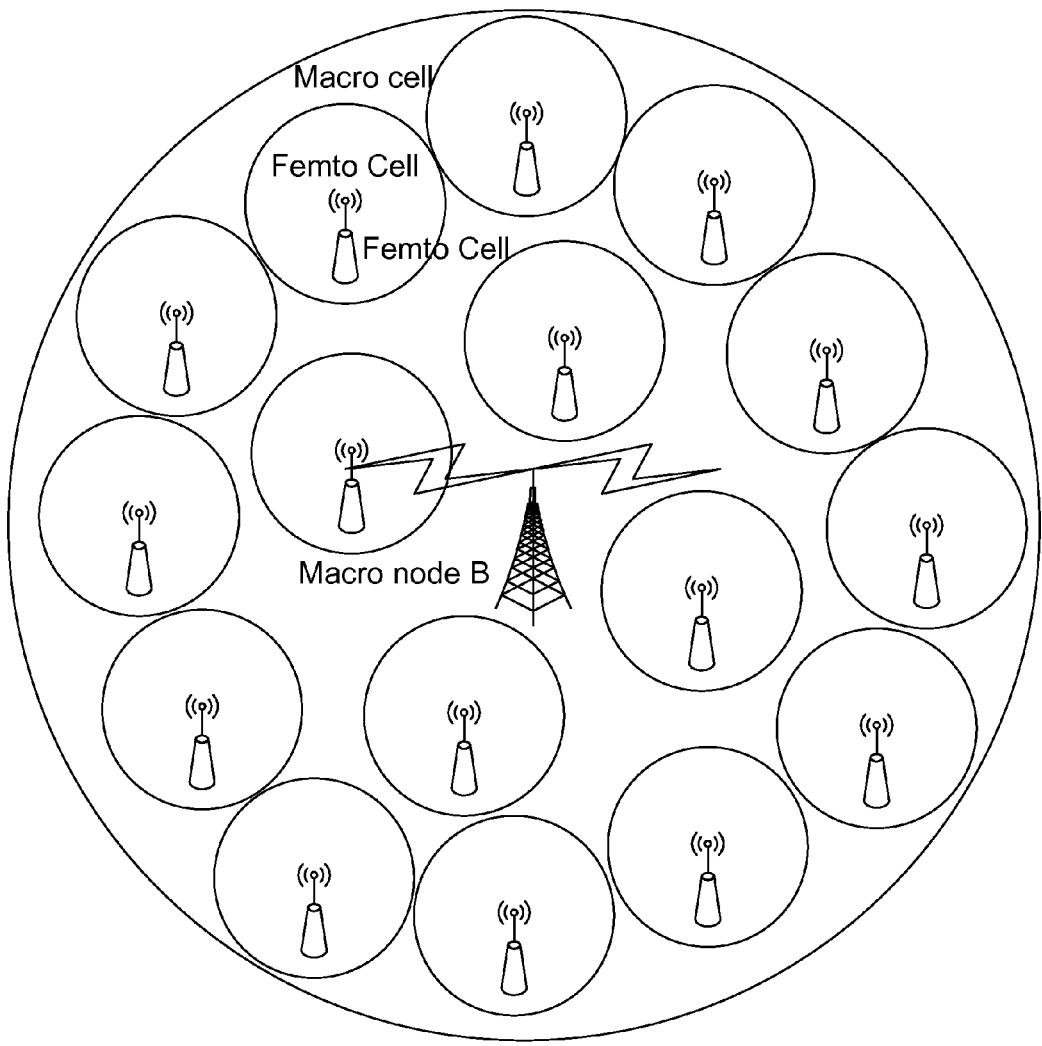
FIG. 1 shows a schematic diagram of the coverage of a macro node B and the coverage of a Femto Cell in a macro cell after the Femto Cell is introduced.
Figure 2:
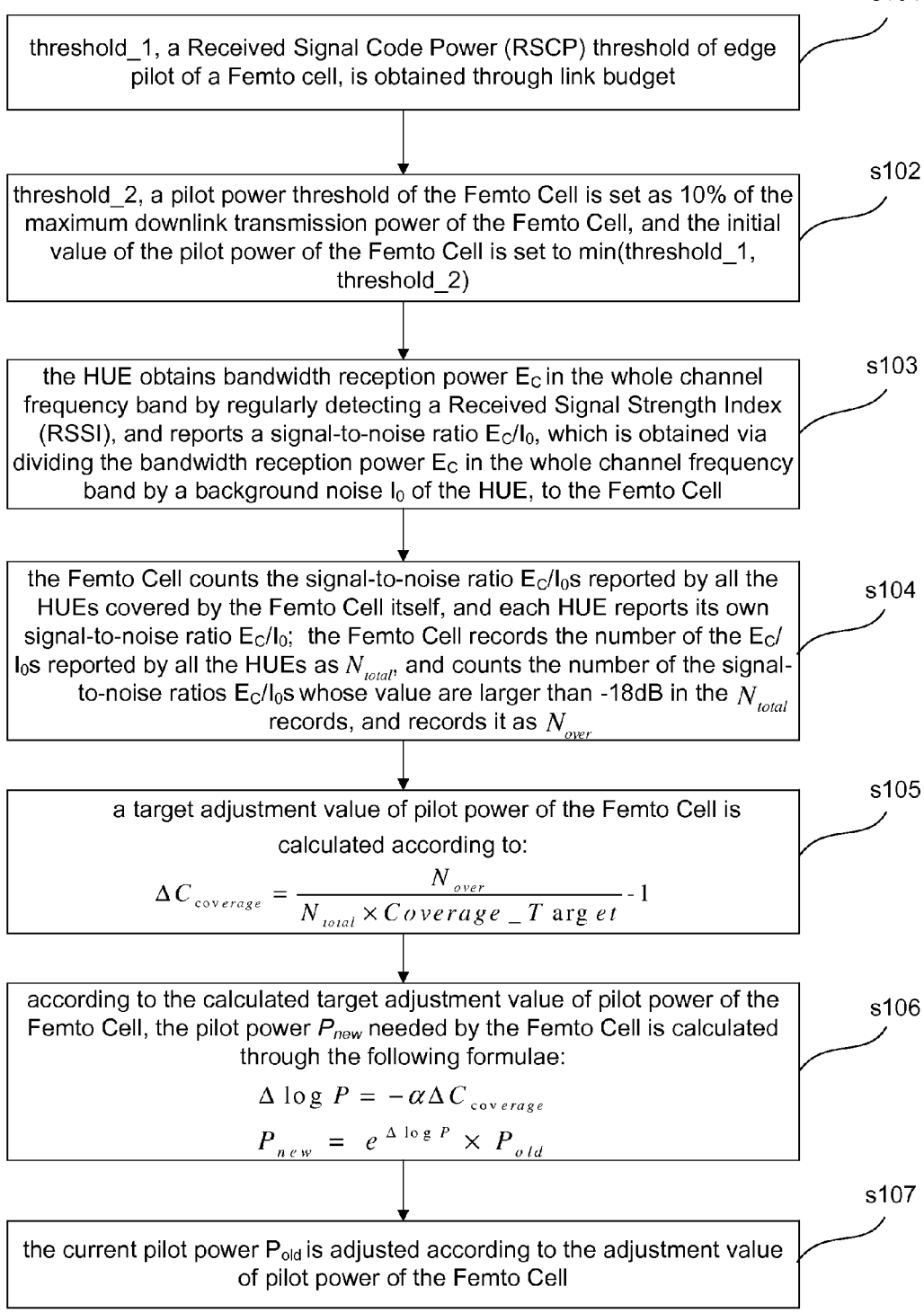
FIG. 2 shows a flowchart of a method for self-adaptive adjustment of pilot power of Femto Cell according to a first embodiment of the present disclosure.

The first embodiment of the present disclosure, as shown in FIG. 2, is a method for self-adaptive adjustment of pilot power of Femto Cell, including the following steps:

Step s101: threshold_1, a Received Signal Code Power (RSCP) threshold of edge pilot of a Femto cell, is obtained through link budget, wherein RSCP is refer to received power after channel de-spread.

The process of link budget comprises:

first, the radius of the Femto cell and the number of indoor walls are introduced into the following link budget reference formula to calculate the link loss PL:

$$PL = 37 + 20 \log d + qW,$$

where PL is link loss or path attenuation, and its unit is dB;

d is the radius of the Femto cell, and its unit is meter;

q is the number of indoor walls and varies depending on d, because in actual application, the larger the radius of the Femto cell is, there may be more walls in a space, the number of indoor walls is larger;

W is a fixed value of 5 dB;

then, the RSCP threshold (threshold_1) of the pilot is obtained by adding the effective demodulation threshold of the HUE to the link loss PL. The effective demodulation threshold of the HUE is preferably −105 dBm.

Step s102: threshold_2, a pilot power threshold of the Femto Cell is set as 10% of the maximum downlink transmission power of the Femto Cell, and the initial value of the is pilot power of the Femto Cell is set to min(threshold_1, threshold_2).

Step s103: the HUE obtains bandwidth reception power $E_C$ in the whole channel frequency band by regularly detecting a Received Signal Strength Index (RSSI), and reports a signal-to-noise ratio $E_C/I_0$, which is obtained via dividing the bandwidth reception power $E_C$ in the whole channel frequency band by a background noise $I_0$ of the HUE, to the Femto Cell. The signal-to-noise ratio $E_C/I_0$ may be changed due to the following reasons: change of downlink interference, such as interference of the macro node B, interference of other Femto Cell transmission power and the like; or change of downlink pilot power received by the HUE, which is caused by objective path attenuation in the city environment, all these changes will result in change of the signal-to-noise ratio $E_C/I_0$ of the HUE. The change of path attenuation is mainly caused by the change of shadow attenuation when the HUE is unmoved.

Step 104: the Femto Cell counts the signal-to-noise ratio $E_C/I_0$s reported by all the HUEs covered by the Femto Cell itself, and each HUE reports its own signal-to-noise ratio $E_C/I_0$; the Femto Cell records the number of the $E_C/I_0$s reported by all the HUEs as $N_{total}$, and counts the number of the signal-to-noise ratios $E_C/I_0$s whose value are larger than −18 dB in the $N_{total}$ records, and records it as $N_{over}$. The Third Generation Partnership Project (3GPP) suggests that the lowest threshold of the lowest signal-to-noise ratio $E_C/I_0$ is −20 dB, and −18 dB is preferably taken as the set threshold after 2 dB allowance is taken into account here.

Step s105: a target adjustment value $\Delta C_{coverage}$ of pilot power of the Femto Cell is calculated through the following formula:

$$\Delta C_{coverage} = \frac{N_{over}}{N_{total} \times \text{Coverage\_Target}} - 1,$$

where Coverage_Target is a target coverage value of the Femto Cell and is set as 99%≤Coverage_Target<100% here. The larger the target coverage value is, the wider the area covered by the Femto Cell is. If the transmission power of the node B is reduced, correspondingly the target coverage area could be reduced. However, the transmission power of the node B cannot be blindly reduced in order to reduce the interference; otherwise, the basic call demand of the user cannot be satisfied. Thus, the target coverage value may have a certain adjustment range, and is preferably 99%≤Coverage_Target<100% after compromise.

Step s106: according to the calculated target adjustment value of pilot power of the Femto Cell, the pilot power $P_{new}$ needed by the Femto Cell is calculated through the following formulae, so that the adjustment value of the pilot power is determined:

$$\Delta \log P = -\alpha \Delta C_{coverage},$$

$P_{new} = e^{\Delta \log P} \times P_{old}$, where α is an indoor attenuation coefficient and the range thereof is 0<α<1, preferably α=0.8. The power adjustment speed depends on the indoor attenuation coefficient α, and the unit of pilot power is mW.

Step s107: the current pilot power $P_{old}$ is adjusted according to the adjustment value of pilot power of the Femto Cell. Through Step s105, we can learn that $N_{over}$ is always smaller than $N_{total}$. When $N_{over}$ is equal to $N_{total} C_{coverage}$ is approximately 0.01, which is a very small positive number. According to the calculated result in Step s106, the pilot power of the Femto Cell can be appropriately reduced. When the difference between $N_{over}$ and $N_{total}$ is larger, and $C_{coverage}$ is a negative number, it means that the pilot power of the Femto Cell should be increased. The pilot power of the Femto Cell may be adjusted in real time or adjusted periodically.

Figure 3:
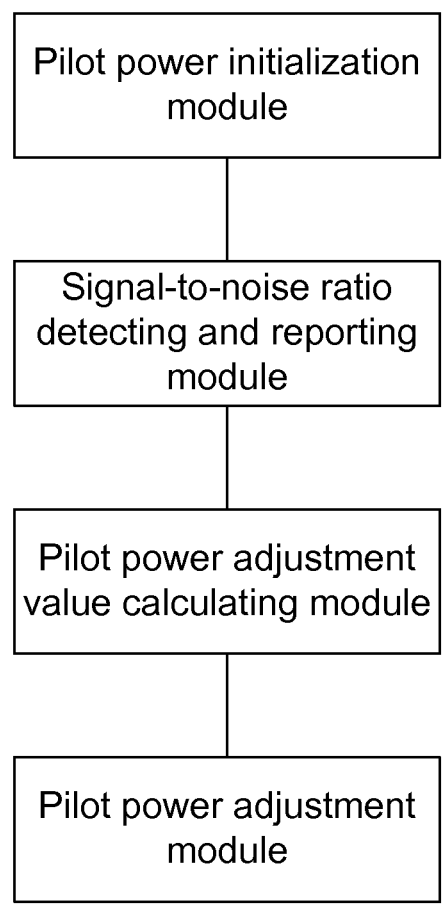
FIG. 3 shows a schematic diagram of a apparatus for self-adaptive adjustment of pilot power of Femto Cell according to a second embodiment of the present disclosure.

The second embodiment of the present disclosure, as shown in FIG. 3, is an apparatus for self-adaptive adjustment of pilot power of Femto Cell, including: a pilot power initialization module, a signal-to-noise ratio detecting and reporting module and a pilot power adjustment value calculating module, wherein the pilot power initialization module is located in the Femto Cell and is configured to introduce a radius of the Femto Cell and the number of indoor walls into the following link budget reference formula to calculate link loss PL:

$$PL = 37 + 20 \log d + qW,$$

where PL is the link loss or path attenuation, and its unit is dB;
d is the radius of Femto Cell, and unit is meter;
q is the number of indoor walls and varies depending on d;
W is a fixed value of 5 dB;
then, the RSCP threshold (i.e. threshold_1) of the pilot is obtained by adding the effective demodulation threshold of the HUE to the link loss PL, wherein the effective demodulation threshold of the HUE is preferably −105 dBm. Threshold_2, the pilot power threshold of the Femto Cell, is set as 10% of the maximum downlink transmission power of the Femto Cell, and the initial value of the pilot power of the Femto Cell is set as min(threshold_1, threshold_2).

The signal-to-noise ratio detecting and reporting module is located in the HUE, and is configured to detect a signal-to-noise ratio in real time and report the signal-to-noise ratio to the pilot power adjustment value calculating module. Specifically, the signal-to-noise ratio detecting and reporting module obtains the bandwidth reception power $E_C$ in the whole channel frequency band by regularly detecting the current RSSI, and reports the signal-to-noise ratio $E_C/I_0$, which is obtained via dividing the bandwidth reception power $E_C$ in the whole channel frequency band by the background noise $I_0$ of the HUE, to the pilot power adjustment value calculating module.

The pilot power adjustment value calculating module is located in the Femto Cell and is configured to determine the adjustment value of the pilot power according to the signal-to-noise ratio reported by the signal-to-noise ratio detecting and reporting module in real time.

Specifically, the pilot power adjustment value calculating module records the number of the signal-to-noise ratios $E_C/I_0$ reported by all signal-to-noise ratio detecting and reporting modules covered by the Femto Cell as $N_{total}$ and counts the number of the signal-to-noise ratios $E_C/I_0$ whose value are larger than the set threshold, and records this number as $N_{over}$, wherein the set threshold may be −18 dB or −20 dB;

the target adjustment value $\Delta C_{coverage}$ of the pilot power is calculated according to the formula:

$$\Delta C_{coverage} = \frac{N_{over}}{N_{total} \times \text{Coverage\_Target}} - 1,$$

where Coverage_Target is the target coverage value of the Femto Cell, which is set as 99%≤Coverage_Target<100% here;

according to the calculated target adjustment value of the pilot power, the pilot is power $P_{new}$ needed by the Femto Cell is calculated according to the following formulae to determine the adjustment value of the pilot power:

$$\Delta \log P = -\alpha \Delta C_{coverage},$$

$P_{new} = e^{\Delta \log P} \times P_{old}$, where α is an indoor attenuation coefficient and its range is 0<α<1.

The apparatus further comprises a pilot power adjusting module configured to adjust the current pilot power according to the adjustment value of the pilot power of the Femto Cell pilot power. $N_{over}$ is always smaller than $N_{total}$. When $N_{over}$ is equal to $N_{total}$, $C_{coverage}$ is approximately 0.01, which is a very small positive number, and at this time the pilot power of the Femto Cell can be appropriately reduced. When the difference between $N_{over}$ and $N_{total}$ is larger, $C_{coverage}$ is a negative number, it means that the pilot power of the Femto Cell should be increased. The pilot power of the Femto Cell can be adjusted in real time or adjusted periodically.

The method and apparatus for self-adaptive adjustment of pilot power of Femto Cell described in the present disclosure adopt a new power control mechanism: after the pilot power of the Femto Cell is initialized, the Femto Cell determines the adjustment value of the pilot power according to the signal-to-noise ratio reported by the HUE in real time, accordingly controls the pilot power of the Femto Cell accessed by each HUE, and enables the pilot power of the current Femto Cell to just satisfy the lowest transmission signal power required by the signal target of the HUE in the coverage of the Femto Cell. The present disclosure can realize accurate power control, and reduce the interference level of the system to improve system capacity, the present disclosure can also allow the HUE to be more effectively accessed to the network. The present disclosure can maximally reduce the interference from the pilot power of the Femto Cell in the macro cell users and the interference between the Femto Cells, while still guarantees the lowest transmission power needed by the HUE. In the self-adaptive control method of is the present disclosure, the call blocking rate of the macro cell is obviously reduced when the load of the Femto Cell is low.

Through the description of the specific embodiments, the technical means adopted by the present disclosure to achieve the expected goal and the effect of the technical means should be further understood. However, the drawings are only introduced for reference and description and not for limiting the present disclosure.

The invention claimed is:

1. A method for self-adaptive adjustment of pilot power of Femto Cell, comprising:
   initializing pilot power of a Femto Cell, and
   determining, by the Femto Cell, an adjustment value of the pilot power according to a signal-to-noise ratio reported by a Home User Equipment (HUE) in real time,
   wherein initializing the pilot power of the Femto Cell comprises: obtaining a Received Signal Coding Power (RSCP) threshold of edge pilot power of the Femto Cell through link budget; setting a pilot power threshold of the Femto Cell based on a maximum downlink transmission power of the Femto Cell; and setting an initial value of the pilot power of the Femto Cell as a smaller one from the RSCP threshold of the edge pilot power of the Femto Cell or the pilot power threshold,
   wherein obtaining the RSCP threshold of edge pilot power of the Femto Cell through link budget comprises:
   introducing a radius of the Femto Cell and a number of indoor walls into a link budget reference formula PL=37+20 log d+qW to calculate link loss, where PL is the link loss or path attenuation, and its unit is dB; d is the radius of Femto Cell, and its unit is meter; q is the number of indoor walls and varies depending on d;
   adding an effective demodulation threshold of the HUE to the link loss to obtain the RSCP threshold of the pilot.

2. The method for self-adaptive adjustment of pilot power of Femto Cell according to claim 1, wherein setting the pilot power threshold of the Femto Cell based on the maximum downlink transmission power of the Femto Cell comprises: setting 10% of the maximum downlink transmission power of the Femto Cell as the pilot power threshold of the Femto Cell.

3. The method for self-adaptive adjustment of pilot power of Femto Cell according to claim 2, determining the adjustment value of the pilot power according to the signal-to-noise ratio reported by the HUE in real time comprises:
   obtaining, by the HUE, bandwidth reception power in a whole channel frequency band through a current received signal strength index; dividing the bandwidth reception power in the whole channel frequency band by a background noise of the HUE to obtain the signal-to-noise ratio; and reporting the signal-to-noise ratio to the Femto Cell;
   recording, by the Femto cell, a number of the signal-to-noise ratios reported by all HUEs covered by the Femto Cell as $N_{total}$, counting a number of the signal-to-noise ratios whose value are larger than the set threshold and recording the number as $N_{over}$;
   calculating a target adjustment value of the pilot power according to a formula $$\Delta C_{coverage} = \frac{N_{over}}{N_{total} \times \text{Coverage\_Target}} - 1,$$

where Coverage_Target is a target coverage value of the Femto Cell, which is set as 99%≤Coverage_Target<100%;
   calculating a pilot power $P_{new}$ needed by the Femto Cell to determine the adjustment value of the pilot power according to the calculated target adjustment value of the pilot power through following formulae:

$\Delta \log P = -\alpha \Delta C_{coverage}$, $P_{new} = e^{\Delta \log P} \times P_{old}$, where $\alpha$ is an indoor attenuation coefficient and its range is $0<\alpha<1$.

4. The method for self-adaptive adjustment of pilot power of Femto Cell according to claim 1, determining the adjustment value of the pilot power according to the signal-to-noise ratio reported by the HUE in real time comprises:
   obtaining, by the HUE, bandwidth reception power in a whole channel frequency band through a current received signal strength index; dividing the bandwidth reception power in the whole channel frequency band by a background noise of the HUE to obtain the signal-to-noise ratio; and reporting the signal-to-noise ratio to the Femto Cell;
   recording, by the Femto cell, a number of the signal-to-noise ratios reported by all HUEs covered by the Femto Cell as $N_{total}$, counting a number of the signal-to-noise ratios whose value are larger than the set threshold and recording the number as $N_{over}$;
   calculating a target adjustment value of the pilot power according to a formula $$\Delta C_{coverage} = \frac{N_{over}}{N_{total} \times \text{Coverage\_Target}} - 1,$$

where Coverage_Target is a target coverage value of the Femto Cell, which is set as 99% ≤Coverage_Target <100%;
   calculating a pilot power $P_{new}$ needed by the Femto Cell to determine the adjustment value of the pilot power according to the calculated target adjustment value of the pilot power through following formulae:

$\Delta \log P = -\alpha \Delta C_{coverage}$, $P_{new} = e^{\Delta \log P} \times P_{old}$, where $\alpha$ is an indoor attenuation coefficient and its range is $0<\alpha<1$.

5. An apparatus for self-adaptive adjustment of pilot power of Femto Cell, comprising: a pilot power initialization module, a signal-to-noise ratio detecting and reporting module and a pilot power adjustment value calculating module, wherein
   the pilot power initialization module is located in a Femto Cell and is configured to obtain a Received Signal Coding Power (RSCP) threshold of edge pilot power of the Femto Cell through link budget, set a pilot power threshold of the Femto Cell based on a maximum downlink transmission power of the Femto Cell, and set an initial value of the pilot power of the Femto Cell as a smaller one from the RSCP threshold of the edge pilot power of the Femto Cell OR the pilot power threshold;

the signal-to-noise ratio detecting and reporting module is located in a Home User Equipment (HUE) and is configured to detect a signal-to-noise ratio in real time and report the signal-to-noise ratio to the pilot power adjustment value calculating module;

the pilot power adjustment value calculating module is located in the Femto Cell and is configured to determine an adjustment value of the pilot power according to the signal-to-noise ratio reported by the signal-to-noise ratio detecting and reporting module in real time, the pilot power initialization module is further configured to:

introduce a radius of the Femto Cell and a number of indoor walls into a link budget reference formula PL=37+20 log d+qW to calculate link loss, where PL is the link loss or path attenuation, and its unit is dB; d is the radius of Femto Cell, and its unit is meter; q is the number of indoor walls and varies depending on d; and add an effective demodulation threshold of the HUE to the link loss to obtain the RSCP threshold of the pilot.

6. The apparatus for self-adaptive adjustment of pilot power of Femto Cell according to claim 5, wherein the pilot power initialization module is further configured to set 10% of the maximum downlink transmission power of the Femto Cell as the pilot power threshold of the Femto Cell.

7. The apparatus for self-adaptive adjustment of pilot power of Femto Cell according to claim 5, the signal-to-noise ratio detecting and reporting module is further configured to: obtain bandwidth reception power in a whole channel frequency band through a current received signal strength index, divide the bandwidth reception power in the whole channel frequency band by a background noise of the HUE to obtain the signal-to-noise ratio and report the signal-to-noise ratio to the Femto Cell.

8. The apparatus for self-adaptive adjustment of pilot power of Femto Cell according to claim 7, wherein the pilot power adjustment value calculating module is further configured to: record a number of the signal-to-noise ratios reported by all signal-to-noise ratio detecting and reporting modules covered by the Femto Cell as $N_{total}$, count a number of the signal-to-noise ratios whose value are larger than the set threshold and record the number as $N_{over}$;

calculate a target adjustment value of the pilot power according to a formula $$\Delta C_{coverage} = \frac{N_{over}}{N_{total} \times \text{Coverage\_Target}} - 1,$$

where Coverage_Target is a target coverage value of the Femto Cell, which is set as 99%≤Coverage_Target<100%; and calculate a pilot power $P_{new}$ needed by the Femto Cell to determine the adjustment value of the pilot power according to the calculated target adjustment value of the pilot power through following formulae:

$\Delta \log P = -\alpha \Delta C_{coverage}$, $P_{new} = e^{\Delta \log P} \times P_{old}$, where $\alpha$ is an indoor attenuation coefficient and its range is $0<\alpha<1$.

9. The apparatus for self-adaptive adjustment of pilot power of Femto Cell according to claim 5, wherein the pilot power adjustment value calculating module is further configured to: record a number of the signal-to-noise ratios reported by all signal-to-noise ratio detecting and reporting modules covered by the Femto Cell as $N_{total}$, count a number of the signal-to-noise ratios whose value are larger than the set threshold and record the number as $N_{over}$;

calculate a target adjustment value of the pilot power according to a formula $$\Delta C_{coverage} = \frac{N_{over}}{N_{total} \times \text{Coverage\_Target}} - 1,$$

where Coverage_Target is a target coverage value of the Femto Cell, which is set as 99%≤Coverage_Target<100%; and calculate a pilot power $P_{new}$ needed by the Femto Cell to determine the adjustment value of the pilot power according to the calculated target adjustment value of the pilot power through following formulae:

$\Delta \log P = -\alpha \Delta C_{coverage}$, $P_{new} = e^{\Delta \log P} \times P_{old}$, where $\alpha$ is an indoor attenuation coefficient and its range is $0<\alpha<1$.

* * * * *